United States Patent [19]

Tholen et al.

[11] 4,124,979
[45] Nov. 14, 1978

[54] INTERNAL COMBUSTION ENGINE WITH EXHAUST GAS TURBO SUPER CHARGER

[75] Inventors: Paul Tholen, Bensberg-Refrath; Gerhard Finsterwalder, Bensberg, both of Fed. Rep. of Germany

[73] Assignee: Klöckner-Humboldt-Deutz Aktiengesellschaft, Cologne, Fed. Rep. of Germany

[21] Appl. No.: 745,879

[22] Filed: Nov. 29, 1976

[30] Foreign Application Priority Data

Nov. 29, 1975 [DE] Fed. Rep. of Germany ....... 2553821

[51] Int. Cl.² .............................................. F02B 29/04
[52] U.S. Cl. ........................................ 60/599; 60/606; 60/619
[58] Field of Search ................. 60/599, 600, 606, 614, 60/617, 619

[56] References Cited

U.S. PATENT DOCUMENTS

| | | | |
|---|---|---|---|
| 3,163,984 | 1/1965 | Dumont | 60/606 |
| 3,232,044 | 1/1966 | Gratzmuller | 60/606 |
| 3,423,927 | 1/1929 | Scherenberg | 60/606 |
| 3,728,856 | 4/1973 | Scherenberg | 60/599 |
| 3,949,555 | 4/1976 | Melchior | 60/619 |
| 3,988,894 | 11/1976 | Melchior | 60/619 |
| 4,009,574 | 3/1977 | Melchior | 60/619 |

Primary Examiner—Charles J. Myhre
Assistant Examiner—David D. Reynolds
Attorney, Agent, or Firm—Walter Becker

[57] ABSTRACT

An internal combustion engine with exhaust gas turbocharger, according to which in the lower partial load range of the engine for purposes of increasing the temperature of the air charge exhaust gas from an exhaust gas conduit is through a connecting line admixed to the compressed air charge, and according to which in the full load range a portion of the compressed air charge is through a connecting line passed from an air charge pressure line into the exhaust gas conduit ahead of the exhaust gas turbine. Ahead of where the connecting line leads into the air charge pressure line, there is provided an air charge cooler which by means of a thermostatic control controls the charge air of the internal combustion engine to a predetermined temperature.

3 Claims, 2 Drawing Figures

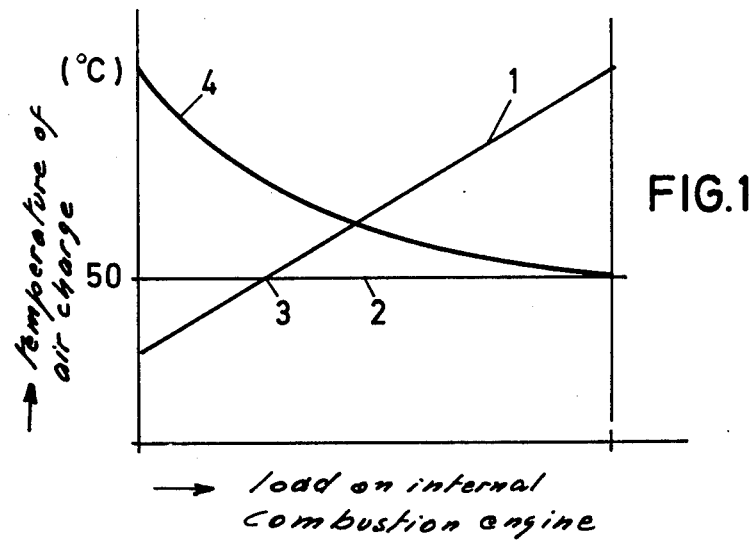
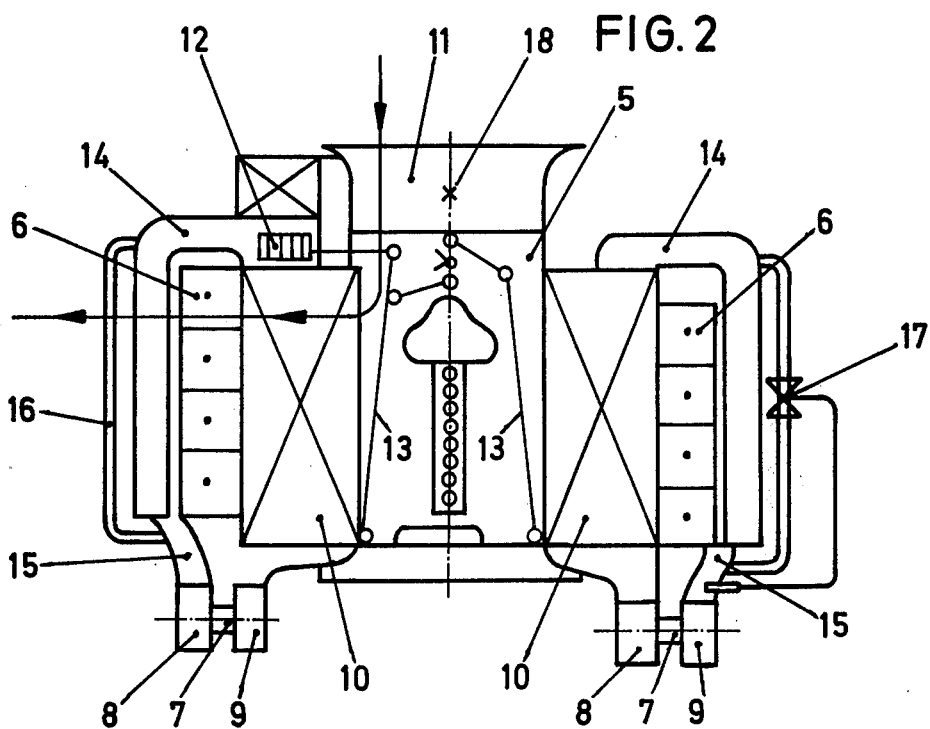

INTERNAL COMBUSTION ENGINE WITH EXHAUST GAS TURBO SUPER CHARGER

The present invention relates to an internal combustion engine with waste gas turbo supercharger in which in the lower range of partial load, for purposes of increasing the temperature of the charged air, waste gas from a waste gas conduit is through a connecting line admixed to the compressed air charge, and in which in the full load range, a portion of the compressed air charge is through a connecting line conveyed from an air charge pressure line into the waste gas conduit ahead of the waste gas turbine.

An internal combustion engine of this type has been described in German Auslegeschrift No. 1237835. In this way, in the partial load range, a sufficiently high compression temperature is obtained for an economically advantageous combustion of the fuel, in conformity with the present invention. By cooling the waste gases in the full load range, the waste gas turbine is protected against overheating, but it is not assured that the air charge in the full load range will have an optimum temperature as is desired for the load of the structural elements and for the combustion.

It is, therefore, an object of the present invention to improve the operational behavior of the internal combustion engine while simultaneously increasing the output.

This object and other objects and advantages of the invention will appear more clearly from the following specification in connection with the accompanying drawing, in which:

FIG. 1 represents a graph illustrating the principle of the charge air temperature prior to entering the internal combustion engine.

FIG. 2 diagrammatically illustrates a top view of the combustion engine according to the invention.

The internal combustion engine according to the present invention is characterized primarily in that an air charge cooler is arranged in front of where the connecting conduit leads into the charge air pressure line, said charge air cooler being operable by means of a thermostatic control to control the charge air of the internal combustion engine so as to substantially equal a predetermined temperature.

Due to adjusting the air charge temperature in the full load range to a desired value which is an optimum value for the combustion and the load acting on the structural elements, overheating and inadmissible peak pressures will be avoided. The charge pressure will in a manner known per se be controlled by directing the charge air into the waste gas conduit whereby at the same time a cooling of the waste gas and thus a protection of the waste gas turbine will be realized. In the partial load range, the air charge is heated by the waste gas beyond the desired value of the full load range and is additionally thinned. Both features result in an improvement in the waste gas by a reduction of the CH and $NO_x$ emission.

According to a further development of the invention, it is suggested so to design the waste gas turbo supercharger that in the connecting line between the waste gas conduit and the air charge pressure conduit at an operational point in the partial load range of the internal combustion engine there will automatically be effected a pressure reversal. As a result thereof, an automatic control is obtained without special control means. This type of control may be modified by controlling the connecting line by a control element in conformity with the waste gas temperature. In this way with a minimum of parts, especially control devices, an optimum adaptation to the conditions of operation will be realized.

Referring now to the drawing in detail, the diagram of FIG. 1 shows the interrelationship of the air charge temperature and the load of the internal combustion engine which latter is plotted over the abscissa. The temperature is plotted over the ordinate. Line 1 indicates the course of the temperature of the air charge without air charge cooler. Line 2 shows the course of the temperature for a constant air charge temperature of 50° when employing an air charge cooler while the air charge temperature on the left side of a point of intersection of lines 1 and 2 assumes the value corresponding to line 1.

Line 4 shows the course of the temperature with an internal combustion engine according to the invention, with which, behind the air charge cooler, in the partial air range, waste gas is admixed to the air charge.

With reference to FIG. 2, the reference numeral 5 characterizes an air cooled reciprocable piston internal combustion engine having its cylinders 6 arranged in a V-shaped manner. For each row of cylinders there is provided a waste gas turbo supercharger 7 with a waste gas turbine 8 and a compressor 9. The compressor 9 conveys the combustion air through an air charge cooler 10 which is passed through by cooling air in cross flow which cooling air is conveyed by a blower 11. The cooling air throughput through the air charge cooler 10 is controlled by thermostat 12 in the air charge conduit 14 on the pressure side of the air charge cooler 10 regulated by means of flaps 13. It is also possible instead of controlling the cooling air throughput by flaps 13, to control the air throughput by directly influencing the speed of the blower, when, for instance, the blower is controlled hydraulically in a manner known per se. Between the air charge pressure line 14 and a waste gas conduit 15 leading to the waste gas turbine 8, there is provided a connecting line 16. By arranging the waste gas turbo supercharger 7, a pressure reversal is obtained in the connecting line 16 at a predetermined operational point in the partial load range of the internal combustion engine 5. In the range determined by the pressure reversal, a further thermostatic control (12) is possible by a control valve 17 which is controlled in conformity with the waste gas temperature so that at partial load more or less waste gas of the air charge is added or admixed whereas at full load more or less air charge is directed into the waste gas conduit.

It is, of course, to be understood that the present invention is by no means limited to the specific showing in the drawing, but also comprises any modifications within the scope of the appended claims.

What we claim is:

1. An internal combustion engine with exhaust gas turbo super charger means, which includes in combination: air compressor means, exhaust gas conduit means, connecting line means communicating with said exhaust gas conduit means and with said compressor means for conveying in the lower partial load range of the engine exhaust gas from said exhaust gas conduit means to an air charge compressed by said compressor means for purposes of increasing the temperature of said air charge, air charge pressure conduit means, said connecting line means communicating with said air charge pressure conduit means, exhaust gas turbine means, said connecting line means also communicating with said exhaust gas conduit means at a point ahead of said exhaust gas turbine means for conveying in the full load range of said engine a portion of the compressed air charge from said air charge pressure conduit means into said exhaust gas conduit means ahead of said exhaust gas turbine means, air charge cooler means arranged ahead of where said connecting line means leads into said air charge pressure conduit means, and thermostatic control means operatively connected to said air charge cooler means and operable in cooperation therewith to control the air charge in conformity with a predetermined temperature both to improve effeciency and to reduce temperature of exhaust gas when admixed for prewarming the combustion air charge.

2. An internal combustion engine in combination according to claim 1, in which said exhaust gas super charger means is so designed that at one point of operation in the partial load range of said engine a pressure reversal is automatically effected in said connecting line means between said exhaust gas conduit means and said air charge pressure conduit means.

3. An internal combustion engine in combination according to claim 1, which includes further thermostatic control means arranged in said connecting line means between said exhaust gas conduit means and said charge air pressure conduit means and operable in conformity with the temperature of the exhaust gas from said engine.

* * * * *